United States Patent
Wang

(10) Patent No.: US 12,182,414 B2
(45) Date of Patent: Dec. 31, 2024

(54) METHOD AND APPARATUS FOR DETECTING DATA PATH, AND STORAGE MEDIUM

(71) Applicant: CHANGXIN MEMORY TECHNOLOGIES, INC., Hefei (CN)

(72) Inventor: Jia Wang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 119 days.

(21) Appl. No.: 17/936,080

(22) Filed: Sep. 28, 2022

(65) Prior Publication Data

US 2023/0073572 A1 Mar. 9, 2023

Related U.S. Application Data

(63) Continuation of application No. PCT/CN2022/093557, filed on May 18, 2022.

(30) Foreign Application Priority Data

Sep. 8, 2021 (CN) .......................... 202111047660.1

(51) Int. Cl.
G06F 3/06 (2006.01)
(52) U.S. Cl.
CPC .......... *G06F 3/0616* (2013.01); *G06F 3/0653* (2013.01); *G06F 3/0673* (2013.01)
(58) Field of Classification Search
CPC ..... G06F 3/0616; G06F 3/0653; G06F 3/0673
See application file for complete search history.

(56) References Cited

U.S. PATENT DOCUMENTS

| | | | | |
|---|---|---|---|---|
| 5,657,292 A | * | 8/1997 | McClure | G11C 7/1051 |
| | | | | 365/230.09 |
| 7,388,797 B2 | * | 6/2008 | Do | G11C 29/025 |
| | | | | 365/201 |

(Continued)

FOREIGN PATENT DOCUMENTS

| | | |
|---|---|---|
| CN | 1941210 A | 4/2007 |
| CN | 101055767 A | 10/2007 |

(Continued)

OTHER PUBLICATIONS

International Search Report cited in PCT/CN2022/093557 mailed Aug. 23, 2022, 9 pages.

*Primary Examiner* — Joseph O Schell
*Assistant Examiner* — Indranil Chowdhury
(74) *Attorney, Agent, or Firm* — Kilpatrick Townsend & Stockton LLP

(57) ABSTRACT

The present disclosure provides a method and an apparatus for detecting a data path, and a storage medium, relates to the technical field of semiconductors, and is applied to a process of detecting a data path of a semiconductor integrated circuit. The method for detecting a data path includes: disconnecting, by a detection apparatus, a connection between a global data line and a local data line in the data path, writing test data into the global data line in the data path via the data path through a write port of the data path, reading, by the detection apparatus, target data of the global data line under a preset condition, and further detecting a defect of the data path according to the test data and the target data.

14 Claims, 8 Drawing Sheets

(56) References Cited

U.S. PATENT DOCUMENTS

| | | | |
|---|---|---|---|
| 7,773,439 B2 | 8/2010 | Do et al. | |
| 10,014,070 B2 | 7/2018 | Grunzke | |
| 2003/0043664 A1* | 3/2003 | Haraguchi | G11C 29/44 365/201 |
| 2003/0174546 A1* | 9/2003 | Parris | G11C 11/4093 365/190 |
| 2004/0153947 A1* | 8/2004 | Beer | G11C 29/44 714/763 |
| 2007/0070675 A1* | 3/2007 | Do | G11C 29/025 365/63 |
| 2008/0002491 A1* | 1/2008 | Ku | G11C 29/022 365/201 |
| 2008/0082900 A1 | 4/2008 | Yoon | |
| 2012/0081982 A1* | 4/2012 | Yi | G11C 29/022 365/194 |
| 2012/0113731 A1* | 5/2012 | Shimano | G11C 8/04 365/189.15 |
| 2016/0180965 A1* | 6/2016 | Lee | G11C 29/025 365/201 |
| 2016/0196867 A1* | 7/2016 | Chang | G11C 11/419 365/156 |
| 2017/0069358 A1* | 3/2017 | Yun | G11C 29/50012 |
| 2020/0202952 A1* | 6/2020 | Lee | G11C 16/3495 |
| 2021/0026564 A1* | 1/2021 | Her | G06F 11/1048 |
| 2021/0280265 A1* | 9/2021 | Tezuka | G11C 29/24 |
| 2022/0004324 A1* | 1/2022 | Ballapuram | G06F 3/0655 |
| 2022/0308788 A1* | 9/2022 | Zhao | G11C 29/12015 |
| 2023/0010129 A1* | 1/2023 | Liu | G11C 11/4096 |
| 2024/0004557 A1* | 1/2024 | Lee | G06F 3/0679 |

FOREIGN PATENT DOCUMENTS

| | | | | |
|---|---|---|---|---|
| CN | 108806758 A | | 11/2018 | |
| CN | 111563012 A | | 8/2020 | |
| EP | 3651155 B1 | * | 6/2021 | ......... G06F 12/0246 |
| WO | WO-2014110077 A1 | * | 7/2014 | ........... G11C 29/025 |
| WO | WO-2022217845 A1 | * | 10/2022 | ............ G11C 29/42 |

* cited by examiner

METHOD AND APPARATUS FOR DETECTING DATA PATH, AND STORAGE MEDIUM

CROSS-REFERENCE TO RELATED APPLICATIONS

This is a continuation of International Application No. PCT/CN2022/093557, filed on May 18, 2022, which claims the priority to Chinese Patent Application No. 202111047660.1, titled "METHOD, APPARATUS AND DEVICE FOR DETECTING DATA PATH, AND STORAGE MEDIUM" and filed on Sep. 8, 2021. The entire contents of International Application No. PCT/CN2022/093557 and Chinese Patent Application No. 202111047660.1 are herein incorporated into the present disclosure for reference.

TECHNICAL FIELD

The present disclosure relates to, but is not limited to, a method and an apparatus for detecting a data path, and a storage medium.

BACKGROUND

A dynamic random access memory (DRAM) is a chip with high-density repetitive memory array cells. With increasing demands of the application side, the memory array cells constantly shrink, posing a great challenge to the manufacturing process.

For a DRAM, if there is a problem with its internal memory array cells, it is usually difficult to test the problem to determine whether a write data path fails, or a read data path fails, or a control circuit fails, affecting overall product research and development time.

SUMMARY

An overview of the subject matter detailed in the present disclosure is provided below, which is not intended to limit the protection scope of the claims.

The present disclosure provides a method and an apparatus for detecting a data path, and a storage medium.

According to a first aspect of embodiments of the present disclosure, a method for detecting a data path is provided, including:
  disconnecting, by a detection apparatus, a connection between a global data line and a local data line in the data path;
  writing, by the detection apparatus, test data into the global data line in the data path via the data path through a write port of the data path;
  reading, by the detection apparatus, target data of the global data line under a preset condition; and
  detecting, by the detection apparatus, a defect of the data path according to the test data and the target data.

A second aspect of the present disclosure provides an apparatus for detecting a data path, including:
  a processor; and
  a memory configured to store an instruction executable by the processor, wherein
  the processor is configured to perform:
  disconnecting a connection between a global data line and a local data line in the data path;
  writing test data into the global data line in the data path via the data path through a write port of the data path;
  reading target data of the global data line under a preset condition; and
  detecting a defect of the data path according to the test data and the target data.

According to a third aspect of the embodiments of the present disclosure, a non-transitory computer-readable storage medium is provided, wherein when executed by a processor of a detection device, an instruction in the storage medium enables the detection device to perform the method for detecting a data path as described in the first aspect.

Other aspects of the present disclosure are understandable upon reading and understanding of the accompanying drawings and detailed description.

BRIEF DESCRIPTION OF THE DRAWINGS

The accompanying drawings incorporated into the specification and constituting a part of the specification illustrate the embodiments of the present disclosure, and are used together with the description to explain the principles of the embodiments of the present disclosure. In these accompanying drawings, similar reference numerals represent similar elements. The accompanying drawings in the following description illustrate some rather than all of the embodiments of the present disclosure. Those skilled in the art may obtain other accompanying drawings based on these accompanying drawings without creative efforts.

DETAILED DESCRIPTION

The technical solutions in the embodiments of the present disclosure are described below clearly and completely with reference to the accompanying is drawings in the embodiments of the present disclosure. Apparently, the described embodiments are merely some rather than all of the embodiments of the present disclosure. All other embodiments obtained by those skilled in the art based on the embodiments of the present disclosure without creative efforts should fall within the protection scope of the present disclosure. It should be noted that the embodiments in the present disclosure and features in the embodiments may be combined with each other in a non-conflicting manner.

A DRAM (DRAM) is a chip with high-density repetitive memory array cells. With the increasing demands of the application side, the memory array cells constantly shrink, posing a great challenge to the manufacturing process.

In a process of research and development of a new technology, it takes a long time and many iterations to ensure that the memory array cells can be read and written. For a DRAM, if there is a problem with its internal memory array cells, it is usually difficult to test the problem, and it is impossible to determine whether it is a write data path failure, a read data path failure, or a control circuit failure, affecting overall product development time.

The present disclosure provides a method for detecting a data path, applied to a process of detecting a data path of a semiconductor integrated circuit. According to the method for detecting a data path, whether a defect exists in the data path can still be tested even if there is a problem with an array cell of the semiconductor integrated circuit. A test effect is better, and overall test time of the semiconductor integrated circuit is reduced.

Figure 1:
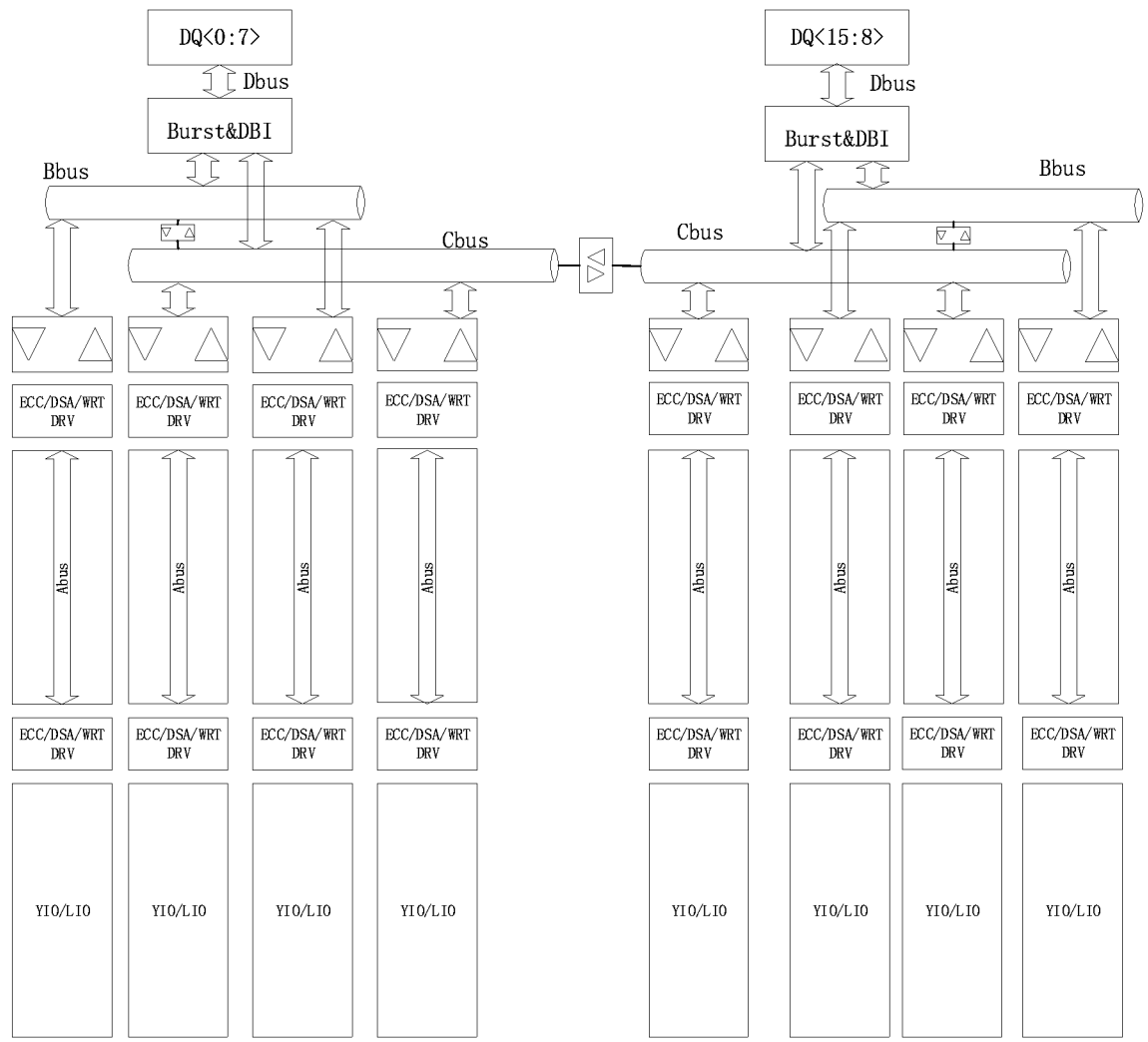
FIG. 1 is a structural diagram of a DRAM according to an exemplary embodiment.

An overall structure of a DRAM is first simply described before the technical content involved in the present disclosure is described. As shown in FIG. 1, a typical structure of the DRAM is provided, showing a process in which write data is stored from an external data port DQ to a memory array, and is read from the memory array to the external data port DQ. In this process, there are generally six steps:
 1. a bidirectional drive channel between Dbus and Bbus;
 2. a bidirectional drive channel between Bbus and Cbus;
 3. a bidirectional drive channel on a Cbus transmission line;
 4. a bidirectional driver between Cbus and Abus;
 5. a drive channel and a sense amplifier circuit between Abus and a data line YIO; and
 6. a drive channel and a sense amplifier circuit between the data line YIO and a data line LIO.

Figure 3:
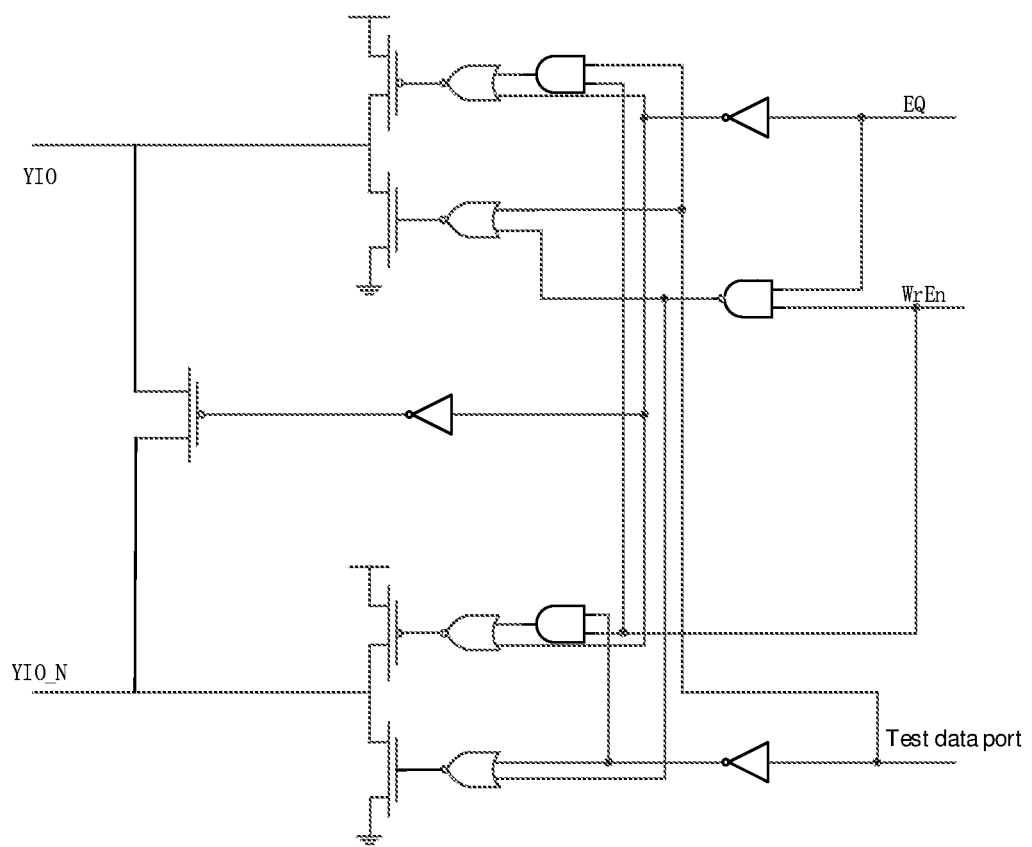
FIG. 3 is a circuit diagram of a write driver circuit of an apparatus for detecting a data path according to an exemplary embodiment.
Figure 4:
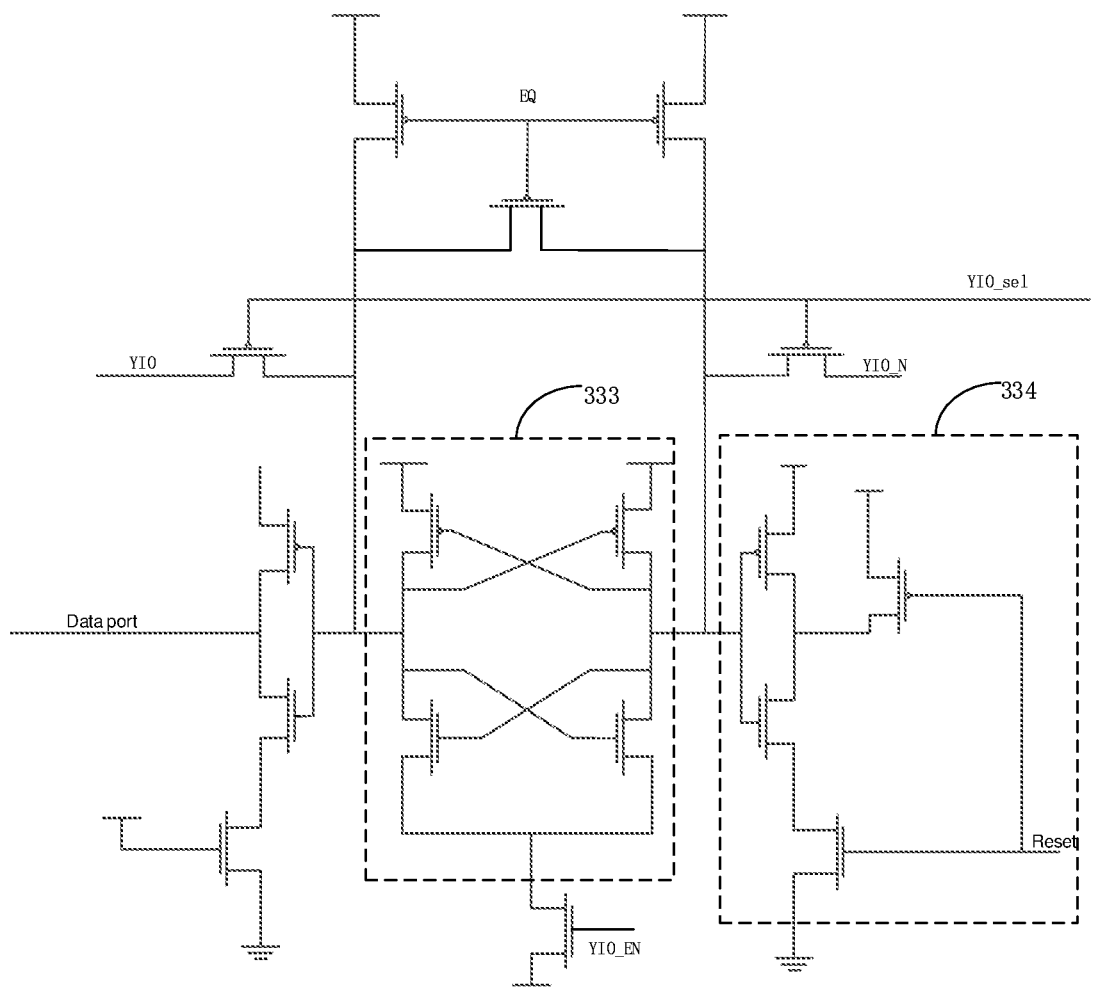
FIG. 4 is a circuit diagram of a read circuit of an apparatus for detecting a data path according to an exemplary embodiment.

A control method in the present disclosure is mainly applied in step 5 and step 6. A write driver circuit and a read circuit involve in step 5. FIG. 3 is a circuit diagram of the write driver circuit of the drive channel involved in step 5. FIG. 4 is a circuit diagram of the read circuit of the drive channel involved in step 5.

In the write driver circuit, a control terminal of the write driver circuit needs to be first turned on, and then target data is written. As shown in FIG. 3, in an example, a potential of an EQ terminal is pulled down, and a potential of a WrEn terminal is pulled up, enabling data write of the write driver circuit. In this case, the write driver circuit may input test data through a test data port, write the test data to the data line YIO, and read target data through YIO and a YIO_N port. The test data port may be represented in the structure shown in FIG. 1 as a port connected to Abus. In another example, if a potential of an EQ terminal is pulled up, and a potential of a WrEn terminal is reduced, disabling data write of the data line YIO, the write driver circuit in this case cannot write data.

In the read circuit, as shown in FIG. 3 and FIG. 4, the data line YIO and the YIO_N port of the write driver circuit are one-to-one connected to a data line YIO and a YIO_N port of the read circuit. The target data of the write driver circuit is read through the port, amplified through a sense amplifier circuit 333, and transmitted to Abus through the data port.

Figure 5:
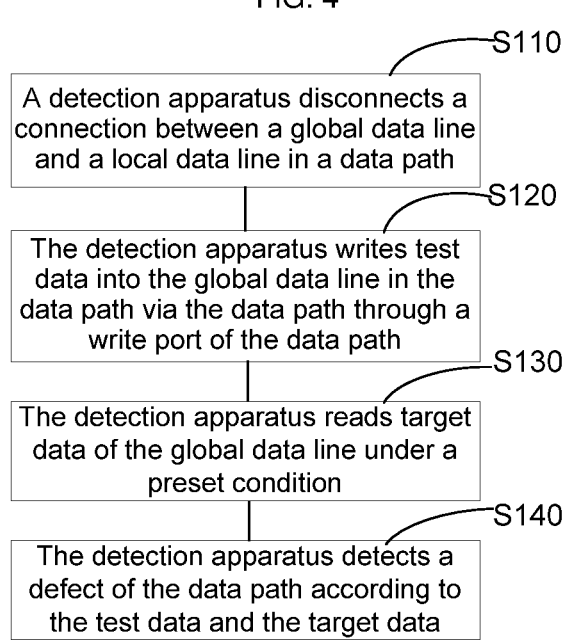
FIG. 5 is a flowchart of a method for detecting a data path according to an exemplary embodiment.

According to an exemplary embodiment, as shown in FIG. 5, a method for detecting a data path is provided in this embodiment, including the following steps:
 S110. A detection apparatus disconnects a connection between a global is data line and a local data line in a data path.
 S120. The detection apparatus writes test data into the global data line in the data path via the data path through a write port of the data path.
 S130. The detection apparatus reads target data of the global data line under a preset condition.
 S140. The detection apparatus detects a defect of the data path according to the test data and the target data.

In the method for detecting in this embodiment, the detection apparatus needs to be used for detection. In a detection process, the detection apparatus is connected to the DRAM, and writes a signal into or reads a signal from the DRAM, to detect the DRAM.

In step S110, to clearly learn whether a defect exists in each part of the data path, in the detection process, connections between all data lines and the local data line need to be disconnected. The global data line is the data line YIO shown in FIG. 1, and the local data line is the data line LIO shown in FIG. 1. After the local data line and the global data line are disconnected, the global data line may be processed in different manners, for example, the global data line may be suspended; for another example, the write driver circuit of the global data line may be kept enabled, to comprehensively detect the defect of the data path.

In step S140, after the test data and the target data are obtained, whether a defect exists in the data path can be detected according to the test data and the target data. When the test data is inconsistent with the target data, it means that there is an error in a process of writing the test data through the data path, or there is an error in a process of reading the target data through the data path, resulting in a data change, which means that a defect exists in the data path. If the test data is consistent with the target data, it means that everything is normal in a process of writing the test data through the data path, and everything is normal in a process of reading the target data through the data path, that is, no defect exists in the data path.

The defect existing in the data path may be a short circuit defect or may be an open circuit defect, which may be determined through detection subsequently performed by the detection apparatus.

In the method for detecting a data path in this embodiment, when the detection is performed, the global data line is disconnected from the local data line. In this case, whether a defect exists in the data path can still be tested even if there is a problem with an array cell of the semiconductor integrated circuit. A test effect is better, and overall test time of the semiconductor integrated circuit is reduced.

Figure 6:
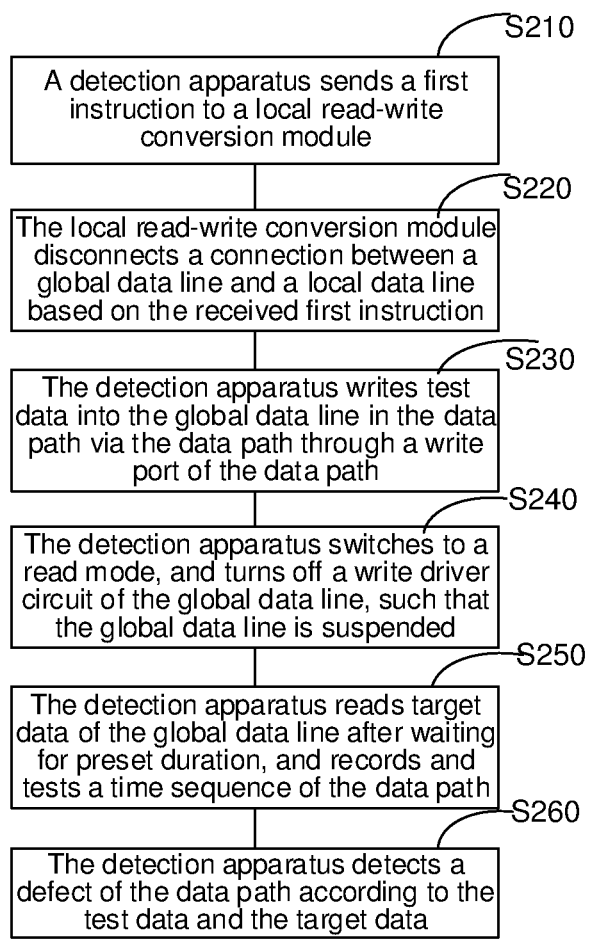
FIG. 6 is a flowchart of a method for detecting a data path according to an exemplary embodiment.

According to an exemplary embodiment, as shown in FIG. 6, a method for detecting a data path in this embodiment includes the following steps:
 S210. A detection apparatus sends a first instruction to a local read-write conversion module.
 S220. The local read-write conversion module disconnects a connection between a global data line and a local data line based on the received first instruction.
 S230. The detection apparatus writes test data into the global data line in the data path via the data path through a write port of the data path.
 S240. The detection apparatus switches to a read mode, and turns off a write driver circuit of the global data line, such that the global data line is suspended.

S250. The detection apparatus reads target data of the global data line after waiting for preset duration, and records and tests a time sequence of the data path.

S260. The detection apparatus detects a defect of the data path according to the test data and the target data.

Figure 2:
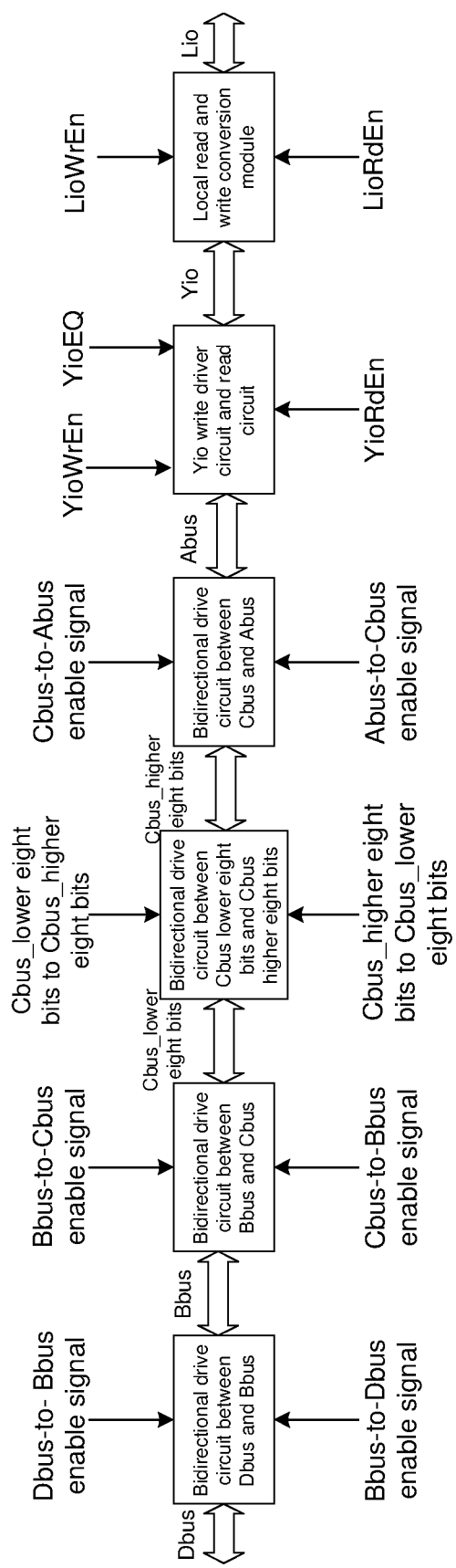
FIG. 2 is a flowchart of a data input process according to an exemplary embodiment.

In step S210, the local read-write conversion module is a part of a DRAM, and the local read-write conversion module may connect or disconnect the global data line YIO and the local data line LIO. In the data input process shown in FIG. 2, the data path may be bidirectional for transmission. Data passes is through Dbus to Bbus and then to Cbus. As shown in FIG. 1, the input data are bidirectionally transmitted between higher eight bits <15:8> and lower eight bits <0:7> on Cbus, and then passes through the global data line YIO and the local data line LIO that are connected to Abus after reaching Abus. As shown in FIG. 2, since LioWrEn and LioRdEn are enable signals of the local read-write conversion module between the global data line YIO and the local data line LIO, when the enable signals change, an on/off status between the global data line YIO and the local data line LIO is affected. In this way, the detection apparatus sends the first instruction to the local read-write conversion module, and the local read-write conversion module disables LioWrEn and LioRdEn based on the instruction, to disconnect the connection between the global data line YIO and the local data line LIO.

Figure 8:
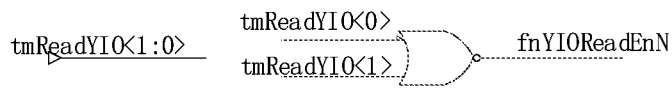
FIG. 8 is a port control diagram of an apparatus for detecting a data path according to an exemplary embodiment.
Figure 9:
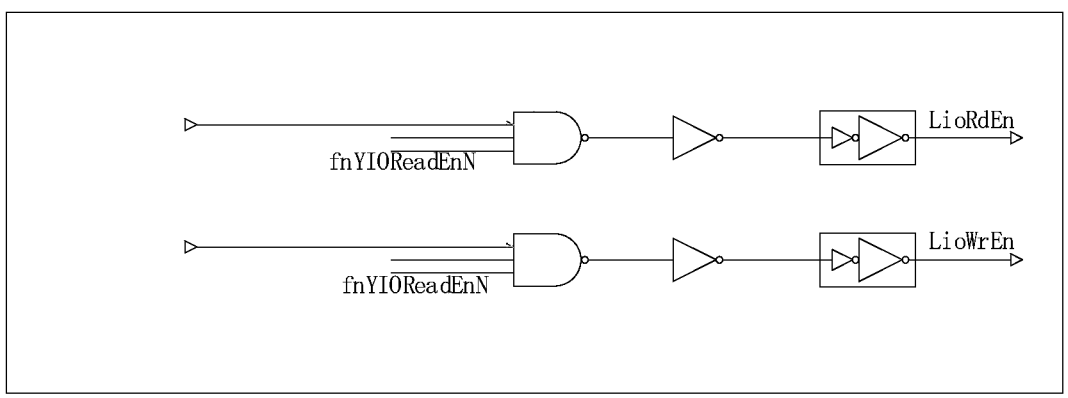
FIG. 9 is a port control diagram of an apparatus for detecting a data path according to an exemplary embodiment.
Figure 10:
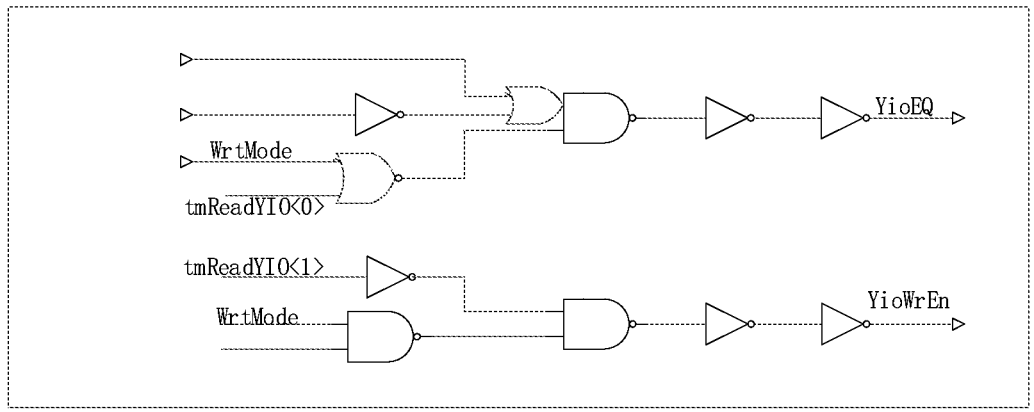
FIG. 10 is a port control diagram of an apparatus for detecting a data path according to an exemplary embodiment.

In step S220, after receiving the first instruction, the local read-write conversion module controls the global data line YIO of the DRAM to be disconnected from the local data line LIO. As shown in FIG. 8, FIG. 9, and FIG. 10, the first instruction sent by the detection apparatus enables tmReadYio<0> to be at a high potential. After a logical circuit in FIG. 8, FIG. 9, and FIG. 10 is passed, LioWrEN and LioRdEN output a low potential, that is, the enable signal of the local read and write switch circuit is disabled, such that the connection between the global data line YIO and the local data line LIO is disconnected.

In step S230, in a state in which the global data line YIO is disconnected from the local data line LIO, the detection apparatus sends an active command (Active cmd), to turn on a word line. Afterwards, the detection apparatus sends a write command (Write cmd), to write the test data to the global data line YIO via the data path. As shown in FIG. 3, the write command pulls up the potential at WrEn, and pulls down the potential at EQ. In this case, a data write path is turned on. After the detection apparatus sends the write command (Write cmd), the test data can be written through the data path.

In step S240, the detection apparatus sends a read command (Read cmd), switches from a write mode to a read mode, and turns off a write driver circuit of the global data line YIO, such that the global data line YIO is suspended. It should be noted that, as shown in FIG. 10, when the detection apparatus switches to the read mode, WrtMode is at a low potential, a YioEQ terminal outputs a high potential, a YioWrEn terminal outputs a low potential, and the write driver circuit of the global data line YIO is turned off, such that the global data line YIO is suspended.

In step S250, the detection apparatus waits for the preset duration according to a detection need. The preset duration is not limited in this embodiment and may be adjusted according to the detection need. In the wait process, the global data line YIO is always kept in a suspending state. Afterwards, the detection apparatus sends a Read cmd command, reads target data on the global data line YIO, and records and tests a time sequence of the data path, to prepare for subsequently analyzing a detection result.

Figure 7:
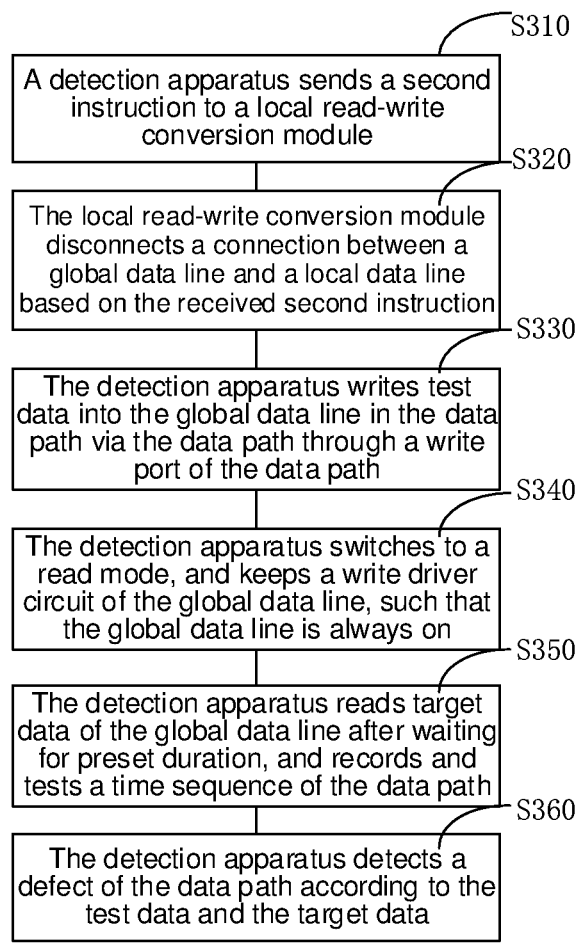
FIG. 7 is a flowchart of an apparatus for detecting a data path according to an exemplary embodiment.

According to an exemplary embodiment, as shown in FIG. 7, a method for detecting a data path in this embodiment includes the following steps:

S310. A detection apparatus sends a second instruction to a local read-write conversion module.

S320. The local read-write conversion module disconnects a connection between a global data line and a local data line based on the received second instruction.

S330. The detection apparatus writes test data into the global data line in the data path via the data path through a write port of the data path.

S340. The detection apparatus switches to a read mode, and keeps a write driver circuit of the global data line, such that the global data line is always on.

S350. The detection apparatus reads target data of the global data line after waiting for preset duration, and records and tests a time sequence of the data path.

S360. The detection apparatus detects a defect of the data path according to the test data and the target data.

In step S310, the local read-write conversion module is a part of a DRAM. The local read-write conversion module is connected to the global data line YIO and the local data line LIO. Data may be written into the global data line YIO and the local data line LIO through a bidirectional data input path shown in FIG. 2, that is, the data passes through Dbus to Bbus and then to Cbus. As shown in FIG. 1, the input data are bidirectionally transmitted between higher eight bits <15:8> and lower eight bits <0:7> on Cbus, and then passes through the global data line YIO and the local data line LIO that are connected to Abus after reaching Abus. In addition, LioWrEn and LioRdEn are enable signals of the local read-write conversion module between the global data line YIO and the local data line LIO. The enable signals are controlled, such that the connection between the global data line YIO and the local data line LIO are connected or disconnected. Therefore, when the detection apparatus sends the second instruction to the local read-write conversion module, where the instruction is used to disable LioWrEn and LioRdEn, the connection between the global data line YIO and the local data line LIO is disconnected.

In step S320, the local read-write conversion module receives the second instruction, such that tmReadYio<0> and tmReadYio<1> are at a high potential. In a logical circuit shown in FIG. 8, FIG. 9, and FIG. 10, LioWrEN and LioRdEN output a low potential, that is, the enable signal of the local read and write switch circuit is disabled, such that the connection between the global data line YIO and the local data line LIO is disconnected.

In step S330, the detection apparatus writes the test data into the global data line YIO in the data path via the data path through the write port of the data path. In a state in which the global data line YIO is disconnected from the local data line LIO, the detection apparatus sends an active command (Active cmd), and turns on a word line. Afterwards, the detection apparatus sends a write command (Write cmd), to write the test data to the global data line YIO via the data path. As shown in FIG. 3, the write command pulls up the potential at WrEn, and pulls down the potential at EQ. In this case, a data write path is turned on. After the detection apparatus sends the write command (Write cmd), the test is data can be written through the data path.

In step S340, the detection apparatus switches to a read mode, and keeps a write driver circuit of the global data line, such that the global data line is always on. As shown in FIG. 10, tmReadYio<1> is at a high potential. Through the output of the logical circuit in FIG. 10, an enable terminal YIO-WrEn of the write driver circuit is always kept at a high potential. In this way, after the detection apparatus switches to the read mode, the write driver circuit of the global data line YIO is kept enabled, such that data on the global data line YIO is retained.

In step S350, the detection apparatus reads target data of the global data line after waiting for the preset duration, and records and tests the time sequence of the data path. The preset duration in this embodiment is not limited and may be adjusted according to a detection need. In the wait process, YioWrEn is always effective, such that data is kept on the global data line YIO. Afterwards, the detection apparatus sends a Read cmd command, reads target data on the global data line YIO, and records and tests a time sequence of the data path, to prepare for subsequently analyzing a detection result.

Figure 11:
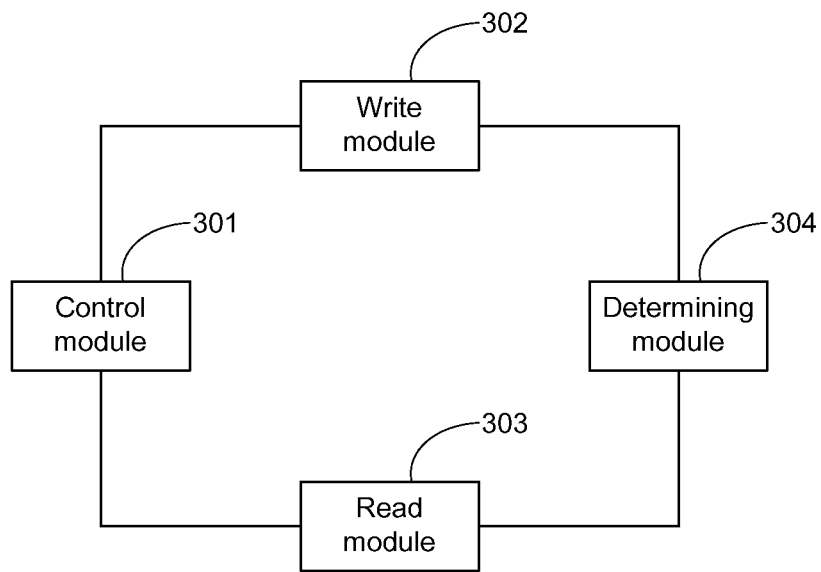
FIG. 11 is a block diagram of an apparatus for detecting a data path according to an exemplary embodiment.

FIG. 11 is a block diagram of an apparatus for detecting a data path according to an exemplary embodiment. As shown in FIG. 11, the apparatus includes a control module 301, a write module 302, a read module 303, and a determining module 304. The control module 301 is configured to disconnect a connection between a global data line and a local data line in a data path. The write module 302 is configured to write test data into the global data line YIO in the data path via the data path through a write port of the data path. The read module 303 is configured to read target data of the global data line YIO under a preset condition. The determining module 304 is configured to detect a defect of the data path according to the test data and the target data.

In an exemplary embodiment, the control module 301 is configured to send a first instruction to a local read-write conversion module, to disconnect the connection between the global data line YIO and the local data line. The control module 301 is configured to switch to a read mode, and turn off a write driver circuit of the global data line YIO, such that the global data line YIO is suspended. The read module 303 is configured to read the target data of the global data line after waiting for preset duration, and record and test a time sequence of the data path.

In another embodiment, the control module 301 is configured to send a second instruction to a local read-write conversion module, to disconnect the connection between the global data line YIO and the local data line, and keep a write driver circuit of the global data line YIO enabled, such that data on the global data line YIO is retained. The control module 301 is configured to switch to a read mode. The read module 303 is configured to read the target data of the global data line, and record and test a time sequence of the data path. The control module 301 may switch to the read mode through the read-write conversion module, and realize the storage of the target data. The read module 303 is configured to read the target data of the global data line YIO after waiting for preset duration, and record and test a time sequence of the data path. The determining module 304 is configured to: when the test data and the target data are inconsistent, determine that a defect exists in the data path.

Figure 12:
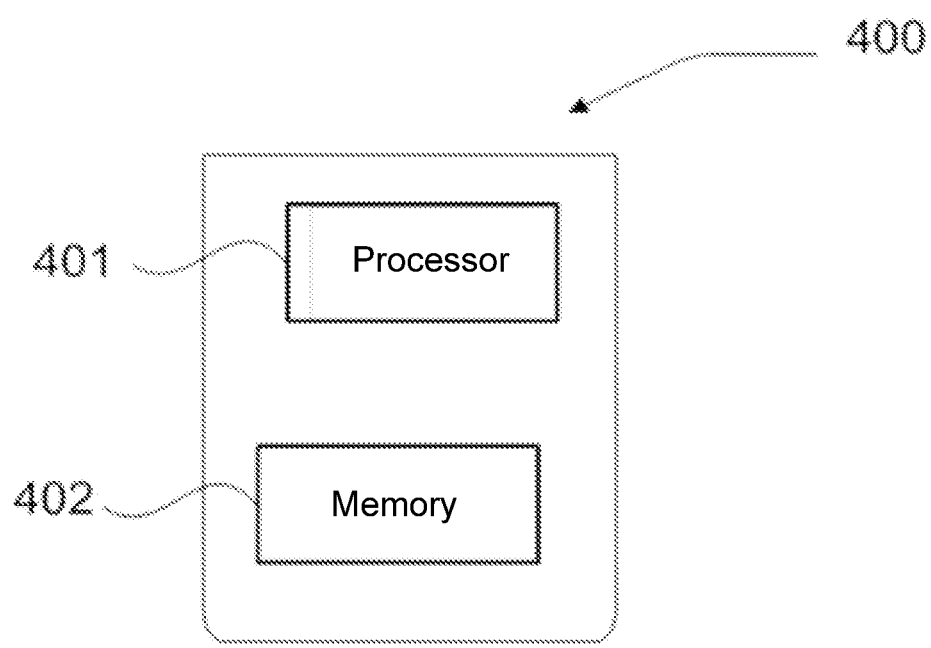
FIG. 12 is a block diagram of an apparatus for detecting a data path according to an exemplary embodiment.

FIG. 12 is a block diagram of an apparatus for detecting a data path, namely, an apparatus for detecting a data path 400, according to an exemplary embodiment. For example, the apparatus for detecting a data path 400 can be provided as a terminal device. Referring to FIG. 12, the apparatus for detecting a data path 400 includes a processor 401, and one or more processors may be set as required. The apparatus for detecting a data path 400 further includes a memory 402 configured to store an instruction executable by the processor 401, such as an application program. One or more memories may be set as required. The memory may store one or more application programs. The processor 401 is configured to execute the instruction to perform the above-mentioned method.

Persons skilled in the art should understand that the embodiments of the present disclosure may be provided as a method, an apparatus (device), or a is computer program product. Therefore, the present disclosure may use a form of hardware only embodiments, software only embodiments, or embodiments with a combination of software and hardware. Moreover, the present disclosure may be in a form of a computer program product that is implemented on one or more computer-usable storage media that include computer-usable program code. The computer storage media include volatile, non-volatile, removable, and non-removable media implemented in any method or technology for storing information (such as computer-readable instructions, data structures, program modules, or other data), including but not limited to, a random access memory (RAM), a read-only memory (ROM), an electrically erasable programmable read-only memory (EEPROM), a flash memory or other storage technologies, a compact disc read-only memory (CD-ROM), a digital versatile disk (DVD) or other optical disc storage, a magnetic cassette, a magnetic tape, magnetic disk storage or other magnetic storage apparatuses, or any other medium that can be used to store desired information and can be accessed by a computer. In addition, as is well known to persons skilled in the art, communication media usually contain computer-readable instructions, data structures, program modules, or other data in modulated data signals such as carrier waves or other transmission mechanisms, and may include any information transfer medium.

In an exemplary embodiment, a non-transitory computer-readable storage medium including an instruction is provided, for example, the memory 402 including the instruction, and the instruction may be executed by the processor 401 of the apparatus for detecting a data path 400 to accomplish the method described above. For example, the non-transitory computer-readable storage medium may be a ROM, a RAM, a CD-ROM, a magnetic tape, a floppy disk, an optical data storage device, or the like. When executed by a processor of a detection device, the instruction in the storage medium enables the detection device to perform the method shown in the method for detecting a data path disclosed in the foregoing embodiments.

The present disclosure is described with reference to the flowcharts and/or is block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct a computer or another programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, persons skilled in the art can make various changes and modifications to the present disclosure without departing from the spirit and scope of the present disclosure. In this way, if these changes and modifications is to the present disclosure fall within the scope of the claims of the present disclosure and equivalent technologies thereof, the present disclosure is further intended to include these changes and modifications.

The embodiments or implementations of this specification are described in a progressive manner, and each embodiment focuses on differences from other embodiments. The same or similar parts between the embodiments may refer to each other.

In the description of this specification, the description with reference to terms such as "an embodiment", "an exemplary embodiment", "some implementations", "a schematic implementation", and "an example" means that the specific feature, structure, material, or characteristic described in combination with the implementation(s) or example(s) is included in at least one implementation or example of the present disclosure.

In this specification, the schematic expression of the above terms does not necessarily refer to the same implementation or example. Moreover, the described specific feature, structure, material or characteristic may be combined in an appropriate manner in any one or more implementations or examples.

It should be noted that in the description of the present disclosure, the terms such as "center", "top", "bottom", "left", "right", "vertical", "horizontal", "inner" and "outer" indicate the orientation or position relationships based on the accompanying drawings. These terms are merely intended to facilitate description of the present disclosure and simplify the description, rather than to indicate or imply that the mentioned apparatus or element must have a specific orientation and must be constructed and operated in a specific orientation. Therefore, these terms should not be construed as a limitation to the present disclosure.

It can be understood that the terms such as "first" and "second" used in the present disclosure can be used to describe various structures, but these structures are not limited by these terms. Instead, these terms are merely intended to distinguish one structure from another.

The same elements in one or more accompanying drawings are denoted by similar reference numerals. For the sake of clarity, various parts in the accompanying drawings are not drawn to scale. In addition, some well-known parts may not be shown. For the sake of brevity, a structure obtained by implementing a plurality of steps may be shown in one figure. In order to understand the present disclosure more clearly, many specific details of the present disclosure, such as the structure, material, size, processing process, and technology of the device, are described below. However, as those skilled in the art can understand, the present disclosure may not be implemented according to these specific details.

Finally, it should be noted that the above embodiments are merely intended to explain the technical solutions of the present disclosure, rather than to limit the present disclosure. Although the present disclosure is described in detail with reference to the above embodiments, those skilled in the art should understand that they may still modify the technical solutions described in the above embodiments, or make equivalent substitutions of some or all of the technical features recorded therein, without deviating the essence of the corresponding technical solutions from the scope of the technical solutions of the embodiments of the present disclosure.

INDUSTRIAL APPLICABILITY

According to the method for detecting a data path in the present disclosure, whether a defect exists in a data path can still be tested even if there is a problem with an array cell of a semiconductor integrated circuit. A test effect is better, and overall test time of the semiconductor integrated circuit is reduced.

The invention claimed is:

1. A method for detecting a data path, applied to a process of detecting the data path of a semiconductor integrated circuit, and comprising:
    disconnecting, by a detection circuit, a connection between a global data line and a local data line in the data path, wherein a local read-write conversion circuit is connected to the global data line and the local data line;
    writing, by the detection circuit, test data into the global data line in the data path via the data path through a write port of the data path and a write driver circuit;
    reading, by the detection circuit, target data of the global data line under a preset condition through a read circuit, wherein the read circuit is connected to the write driver circuit; and
    detecting, by the detection circuit, a defect of the data path according to the test data and the target data.

2. The method for detecting according to claim 1, wherein the disconnecting, by a detection circuit, the connection between the global data line and the local data line in the data path comprises:
    sending, by the detection circuit, a first instruction to the local read-write conversion circuit; and
    disconnecting, by the local read-write conversion circuit, the connection between the global data line and the local data line based on the first instruction received.

3. The method for detecting according to claim 2, wherein the reading, by the detection circuit, the target data of the global data line under a preset condition through a read circuit comprises:
    switching, by the detection circuit, to a read mode, and turning off the write driver circuit of the global data line, such that the global data line is suspended; and
    reading, by the detection circuit, the target data of the global data line after waiting for a preset duration, and recording and testing a time sequence of the data path.

4. The method for detecting according to claim 1, wherein the disconnecting, by a detection circuit, the connection between the global data line and the local data line in the data path comprises:
    sending, by the detection circuit, a second instruction to a local read-write conversion circuit; and disconnecting, by the local read-write conversion circuit, the connection between the global data line and the local data line based on the second instruction received, and keeping the write driver circuit of the global data line enabled, such that data on the global data line is retained.

5. The method for detecting according to claim 4, wherein the reading, by the detection circuit, the target data of the global data line under a preset condition through a read circuit comprises:

switching, by the detection circuit, to a read mode; and reading, by the detection circuit, the target data of the global data line, and recording and testing a time sequence of the data path.

6. The method for detecting according to claim 1, wherein the detecting, by the detection circuit, the defect of the data path according to the test data and the target data comprises:

determining, by the detection circuit when the test data and the target data are inconsistent, that the defect exists in the data path.

7. The method for detecting according to claim 1, wherein the defect comprises a short circuit defect or an open circuit defect.

8. A non-transitory computer-readable storage medium, wherein when executed by a processor of a detection device, an instruction in the non-transitory computer-readable storage medium enables the detection device to perform the method according to claim 1.

9. An apparatus for detecting a data path, configured to detect the data path of a semiconductor integrated circuit, and comprising:

a processor; and a memory configured to store an instruction executable by the processor, wherein the processor is configured to perform:

disconnecting a connection between a global data line and a local data line in the data path, wherein a local read-write conversion circuit is connected to the global data line and the local data line;

writing test data into the global data line in the data path via the data path through a write port of the data path and a write driver circuit;

reading target data of the global data line under a preset condition through a read circuit, wherein the read circuit is connected to the write driver circuit; and detecting a defect of the data path according to the test data and the target data.

10. The apparatus according to claim 9, wherein the processor is further configured to perform:

sending a first instruction to the local read-write conversion circuit, to disconnect the connection between the global data line and the local data line.

11. The apparatus according to claim 10, wherein the processor is further configured to perform:

switching to a read mode, and turning off the write driver circuit of the global data line, such that the global data line is suspended; and reading the target data of the global data line after waiting for a preset duration through a read circuit, and recording and testing a time sequence of the data path.

12. The apparatus according to claim 9, wherein the processor is further configured to perform:

sending a second instruction to the local read-write conversion circuit, to disconnect the connection between the global data line and the local data line, and keeping the write driver circuit of the global data line enabled, such that data on the global data line is retained.

13. The apparatus according to claim 12, wherein the processor is further configured to perform:

switching to a read mode; and reading the target data of the global data line through a read circuit, and recording and testing a time sequence of the data path.

14. The apparatus according to claim 9, wherein the processor is further configured to perform:

determining, when the test data and the target data are inconsistent, that the defect exists in the data path.

* * * * *